(12) United States Patent
Kuwazawa et al.

(10) Patent No.: US 8,277,538 B2
(45) Date of Patent: Oct. 2, 2012

(54) METHOD OF LEACHING COPPER SULFIDE ORE

(75) Inventors: Takenari Kuwazawa, Ibaraki (JP); Akira Miura, Ibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 455 days.

(21) Appl. No.: 12/625,678

(22) Filed: Nov. 25, 2009

(65) Prior Publication Data

US 2010/0313713 A1 Dec. 16, 2010

(30) Foreign Application Priority Data

Jun. 16, 2009 (JP) ................................ 2009-142823
Jul. 28, 2009 (JP) ................................ 2009-175432
Oct. 29, 2009 (JP) ................................ 2009-248978

(51) Int. Cl.
*C22B 3/16* (2006.01)
*C22B 3/08* (2006.01)
(52) U.S. Cl. ............... 75/721; 75/743; 423/27; 423/41
(58) Field of Classification Search ............... 75/721, 75/743; 423/27, 41
See application file for complete search history.

(56) References Cited

U.S. PATENT DOCUMENTS

| | | | |
|---|---|---|---|
| 3,856,913 A | 12/1974 | McElroy et al. | |
| 4,571,387 A * | 2/1986 | Bruynesteyn et al. | ......... 435/262 |
| 5,413,624 A * | 5/1995 | Rusin et al. | ..................... 75/711 |
| 6,168,766 B1 | 1/2001 | Imai et al. | |

FOREIGN PATENT DOCUMENTS

WO WO 00/37690 A1 6/2000

OTHER PUBLICATIONS

Notice of Acceptance dated Feb. 10, 2011 for Australian Application No. 2009251040.

* cited by examiner

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

Disclosed is a method of copper leaching without reducing the growth of iron-oxidizing bacterium and the iron-oxidizing capacity when leaching copper from a copper sulfide ore with the use of a sulfuric acid solution to which iron-oxidizing bacteria and silver have been added. Also disclosed is a method of leaching copper from a copper sulfide ore, including adding a naturally occurring nitrogen-containing organic component to a leaching solution upon copper leaching from a copper sulfide ore with the use of, as the leaching solution, a sulfuric acid solution to which iron-oxidizing bacteria and silver have been added is provided.

4 Claims, 4 Drawing Sheets

METHOD OF LEACHING COPPER SULFIDE ORE

TECHNICAL FIELD

The present invention relates to a method of efficiently leaching copper from a copper sulfide ore, and particularly from a copper sulfide ore or concentrate containing chalcopyrite as a main constituent, with the use of iron-oxidizing bacteria, silver, and a naturally occurring nitrogen-containing organic component.

BACKGROUND ART

In general, examples of known leaching operations for copper sulfide ores via hydrometallurgy include a leaching operation comprising performing an agitated batch reaction with the use of sulfuric acid or hydrochloric acid (tank leaching) and a leaching operation comprising forming an ore heap, supplying sulfuric acid or hydrochloric acid to the top of the ore heap, and recovering liquid dripping therefrom due to the force of gravity (heap leaching). In addition, a method of efficiently leaching copper with the use of bacteria such as iron-oxidizing bacteria and recovering copper (bioleaching) has been known. In the case of bioleaching, iron-oxidizing bacteria oxidize iron (II) ions in a leaching solution into iron (III) ions that serve as oxidants. Such iron (III) ions cause leaching of copper in the ore. In addition, a sulfur component contained in the ore is oxidized into sulfuric acid by sulfur-oxidizing bacteria. The thus obtained sulfuric acid also causes leaching of copper in the ore.

Hydrometallurgy of copper sulfide ore has been applied in practice with the use of a secondary copper sulfide ore containing chalcocite, covellite, or the like. However, in the case of chalcopyrite which most abundantly exists as a copper resource, the copper leaching rate is significantly slower than that in the case of a secondary copper sulfide ore. In such case, it is difficult to efficiently carry out copper leaching.

Hence, a variety of techniques for increasing the rate for leaching copper from a copper sulfide ore containing chalcopyrite as a main constituent have been suggested. For example, a method wherein leaching is carried out by adding activated carbon and iron to a leaching solution and maintaining the oxidation-reduction potential (Ag—AgCl reference electrode) at 350 to 450 mV (JP Patent Publication (Kokai) No. 2005-15864 A) has been reported. Alternatively, methods involving pressurization to an atmospheric pressure or more and heating to 100° C. or more for leaching have been reported (JP Patent Publication (Kokai) No. 2003-328050 A, JP Patent Publication (Kohyo) No. 2001-515145 A, and JP Patent Publication (Kokai) No. 10-317072 A (1998)). However, such leaching methods are problematic in terms of cost increase, although the methods are effective for the improvement of the leaching rate.

In addition to the above techniques, a technique comprising using silver to promote leaching of chalcopyrite has been reported as an example (U.S. Pat. No. 5,730,776). However, it has also been reported that silver inhibits the iron-oxidizing capacity of iron-oxidizing bacteria (De, G. C., et al., Hydrometallurgy, (the Netherlands), 1996, vol. 41, pp. 211-229). Therefore, it is difficult to employ a combination of leaching with the addition of silver and bioleaching. In order to solve the above problem, a copper sulfide ore leaching process using a leaching tank and a bacteria culture tank separately has been suggested (F. Carranza, et al., Hydrometallurgy, (the Netherlands), 1997, vol. 44, pp. 29-42). However, in view of cost and ease of operation, it is desired that leaching and bacterial culture be carried out in a single tank.

Further, it has been known that effects of the addition of an organic nitrogen source during culture of iron-oxidizing bacteria are not significant in terms of iron-oxidizing capacity, resulting in an increase of approximately 20% at maximum in terms of the capacity. In addition, it has been known that the addition of an organic nitrogen source in a certain amount or more causes inhibition of iron oxidization (OLLI H. TUOVINEN, et al., APPLIED AND ENVIRONMENTAL MICROBIOLOGY, (the U.S.), 1979, vol. 37, pp. 954-958).

DISCLOSURE OF THE INVENTION

As described above, it has been known that the addition of silver is effective for efficient copper leaching from a copper sulfide ore containing chalcopyrite as a main constituent. However, in the case of the bioleaching of chalcopyrite with the addition of silver, the growth rate of iron-oxidizing bacterium and the iron oxidization rate decrease due to inhibition caused by silver. In such case, it is difficult to carry out efficient copper leaching, which is problematic.

In view of the above circumstances, it is an object of the present invention to provide a method of copper leaching without reducing the growth of iron-oxidizing bacterium and the iron-oxidizing capacity when leaching copper from a copper sulfide ore with the use of a sulfuric acid solution to which iron-oxidizing bacteria and silver have been added.

As a result of intensive studies in order to achieve the above object, the present inventors have found that the copper leaching rate can be improved by adding a naturally occurring nitrogen-containing organic substance such as corn steep liquor in an adequate amount upon copper leaching from a copper sulfide ore containing chalcopyrite with the use of a sulfuric acid solution to which iron-oxidizing bacteria and silver have been added. This has led to the completion of the present invention.

Specifically, the present invention encompasses the following inventions.

(1) A method of leaching copper from a copper sulfide ore, characterized by comprising adding a naturally occurring nitrogen-containing organic component to a leaching solution upon copper leaching from a copper sulfide ore with the use of, as the leaching solution, a sulfuric acid solution to which iron-oxidizing bacteria and silver have been added.

(2) The method according to (1), wherein the copper sulfide ore is a copper sulfide ore or concentrate containing chalcopyrite as a main constituent.

(3) The method according to (1) or (2), wherein corn steep liquor is used as the naturally occurring nitrogen-containing organic component and the concentration thereof is 0.05 to 0.1 g/L.

(4) The method according to any one of (1) to (3), wherein the silver concentration in the leaching solution is 10 to 50 mg/L.

Figure 1:
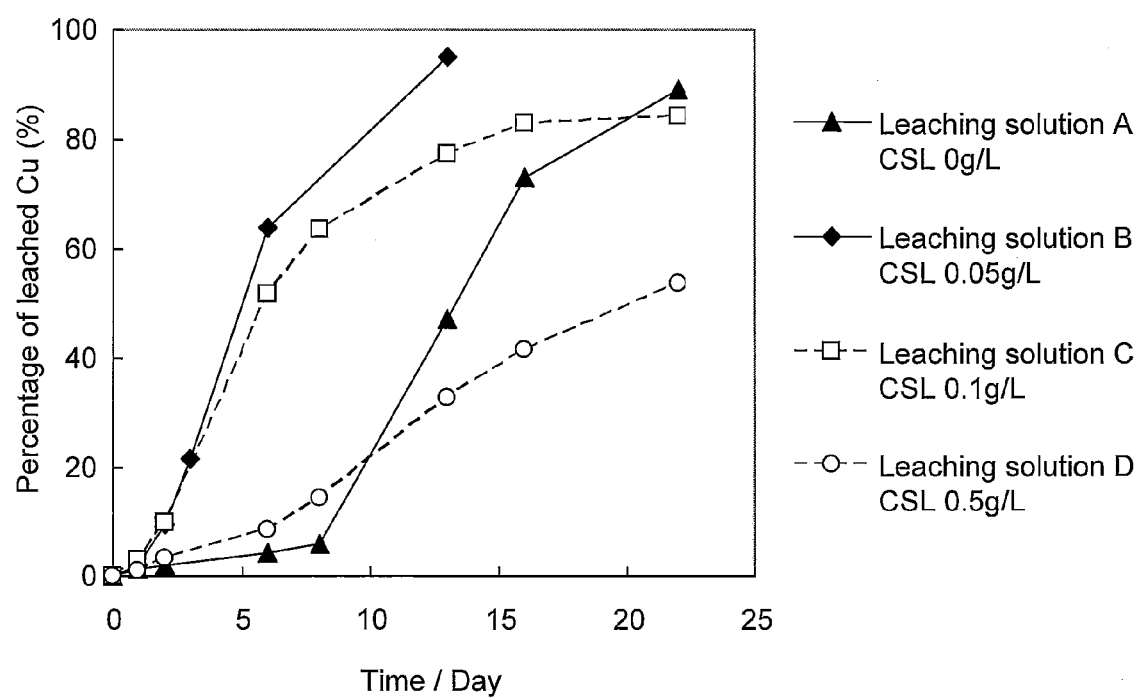
FIG. 1 shows effects of corn steep liquor (abbreviated as "CSL" in the figure) upon copper leaching.

Hereinafter the present invention will be described in detail. The present application claims the priority of Japanese Patent Application No. 2009-142823 filed on Jun. 16, 2009, Japanese Patent Application No. 2009-175432 filed on Jul. 28, 2009, and Japanese Patent Application No. 2009-248978 filed on Oct. 29, 2009 and encompasses contents described in the specification and/or drawings of the patent applications.

The present invention is characterized by comprising adding a naturally occurring nitrogen-containing organic component to a leaching solution upon copper leaching from a copper sulfide ore with the use of, as the leaching solution, a sulfuric acid solution to which iron-oxidizing bacteria and silver have been added.

A copper sulfide ore containing chalcopyrite that is a target ore in the method of the present invention may be a copper sulfide ore containing chalcopyrite as a main constituent or a copper sulfide ore partially containing chalcopyrite. The chalcopyrite content therein is not particularly limited. However, a copper sulfide ore containing chalcopyrite as a main constituent is preferably used such that sufficient copper leaching effects of the method of the present invention can be obtained.

Dissolution/leaching of chalcopyrite according to the method of the present invention is thought to proceed by the following series of catalyst reactions with silver (reactions (1) and (2)).

$$CuFeS_2 + 4Ag^+ \rightarrow Cu^{2+} + Fe^{2+} + 2Ag_2S \quad (1)$$

$$Ag_2S + 2Fe^{3+} \rightarrow 2Ag^+ + S + 2Fe^{2+} \quad (2)$$

In order to cause catalyst reactions shown in reaction (1) and reaction (2) to proceed in a prompt manner, it is preferable to add silver to a leaching solution such that the silver concentration therein becomes 10 to 50 mg/L. Upon the addition of silver, silver may be in the form of a silver nitrate solution, silver chloride, or silver sulfide. However, in view of the ease of handling, a silver nitrate solution is preferable.

When the sum of both sides of the above reactions (reactions (1) and (2)) is obtained such that the silver components are eliminated, the following reaction (3) is obtained. As is understood from reaction (3), in the catalyst reactions caused by silver, ferric (III) ions serve as final electron acceptors. As shown in reaction (4), iron (III) ions are generated through oxidization of iron (II) ions by iron-oxidizing bacteria in a leaching solution. That is, in the case of bioleaching with the use of silver as a catalyst, the leaching rate of chalcopyrite is controlled by the iron (III) ion generation reaction represented by reaction (4).

$$CuFeS_2 + 4Fe^{3+} \rightarrow Cu^{2+} + 5Fe^{2+} + 2S \quad (3)$$

$$4Fe^{2+} + 4H^+ + O_2 \rightarrow 4Fe^{3+} + 2H_2O \quad (4)$$

In other words, in order to promote the above reactions, it is important for an iron oxidation reaction caused by iron-oxidizing bacteria to proceed or to be promoted without inhibition. To achieve this, the presence of iron-oxidizing bacteria is essential for the above reactions. In addition, as shown in reaction (3), elemental sulfur is generated through oxidization of chalcopyrite. In this regard, sulfur-oxidizing bacteria that degrade elemental sulfur may exist. In some cases, sulfur-oxidizing bacteria can promote leaching.

Iron-oxidizing bacteria generally existing in nature can be used as the above iron-oxidizing bacteria as long as they have iron-oxidizing capacity under sulfuric acid-based acidic conditions. As such iron-oxidizing bacteria, generally known *Acidithiobacillus ferrooxidans* and *Leptospirillum ferrooxidans* can be used. Specific examples thereof include the *Acidithiobacillus ferrooxidans* ATCC 23270/DSM 14882/NCBI 8455 and ATCC33020 strains, and the *Acidithiobacillus ferrooxidans* FTH6B strain, which was newly isolated by the present inventors. The FTH6B strain has been deposited with the NITE (National Institute of Technology and Evaluation) Patent Microorganisms Depositary (NPMD) (2-5-8 Kazusakamatari, Kisarazu-shi, Chiba, Japan) as of Jul. 9, 2009, under accession no. NITE P-780, and has been transferred to the international deposit on Sep. 28, 2009 as accession No. NITE BP-780 under the terms of the Budapest Treaty.

Alternatively, iron-oxidizing bacteria to be added that can be used in the present invention are microorganisms existing in nature that have been selectively cultured in a liquid containing iron ions without isolation or microorganisms isolated from nature that have been artificially cultured with the addition of a nutrient source or the like.

In addition, even in a case in which sulfur-oxidizing bacteria exist in the above reaction system, similar effects can be obtained. Sulfur-oxidizing bacteria are not particularly limited as long as they can oxidize sulfur and generate sulfuric acid in a water system or in soil. For example, *Acidithiobacillus thiooxidans* or the like can be used. Specifically, the *Acidithiobacillus* sp. TTH-19A strain (NITE BP-164) and the like can be used.

According to the method of the present invention, the rate of iron (III) ion generation reaction represented by reaction (4) that is caused by iron-oxidizing bacteria can be improved by adding an appropriate amount of naturally occurring nitrogen-containing organic component to a leaching solution upon copper leaching from a copper sulfide ore with the use of a sulfuric acid solution containing iron-oxidizing bacteria and silver as the leaching solution. As a result, prompt copper leaching from chalcopyrite can be realized.

Examples of the aforementioned naturally occurring nitrogen-containing organic component include corn steep liquor, tryptone, molasses, and alcohol fermentation waste fluid. In view of cost, effects of promoting growth of iron-oxidizing bacteria, and the like, corn steep liquor is most preferably used.

Corn steep liquor used in the present invention can be obtained in the form of a concentrate of an immersion solution obtained by immersing corn husk particles in water containing sulfurous acid at 45° C. to 50° C. for 40 to 48 hours. It may be in the form of a paste product or a powder obtained by subjecting a paste product to spraying. Specifically, commercially available products with moisture contents of approximately 50% distributed by San-ei Sucrochemical Co., Ltd., Nihon Shokuhin Kako Co., Ltd., and other manufacturers can be used.

The concentration of corn steep liquor in a leaching solution is preferably 0.05 to 0.1 g/L. If such a naturally occurring nitrogen-containing organic component is added at a concentration exceeding the above range, copper leaching promoting effects are significantly reduced, which is not preferable.

In addition, the leaching temperature may be 20° C. to 80° C., at which iron-oxidizing bacteria existing in nature can grow; however, it is preferably 20° C. to 40° C.

As described above, it has been known that effects of the addition of an organic nitrogen source during culture of iron-oxidizing bacteria are not significant in terms of iron-oxidizing capacity, resulting in an increase of approximately 20% at maximum in terms of the capacity. In addition, it has been known that the addition of an organic nitrogen source in a certain amount or more causes inhibition of iron oxidization (OLLI H. TUOVINEN, et al., APPLIED AND ENVIRONMENTAL MICROBIOLOGY, (the U.S.), 1979, vol. 37, pp. 954-958). To the contrary, as shown in the Examples described below, it was confirmed that iron-oxidizing capacity of iron-oxidizing bacteria was improved, and thus, the percentage of leached copper was significantly increased by the addition of a naturally occurring nitrogen-containing organic component to a leaching solution upon leaching of chalcopyrite with the addition of silver.

BEST MODES FOR CARRYING OUT THE INVENTION

Hereinafter, the present invention is more specifically described by way of examples. However, the present invention is not limited thereto.

Example 1

Effects of the Addition of Corn Steep Liquor Upon Copper Leaching

A copper concentrate, from Candelaria mine (Chile), containing chalcopyrite as a main constituent was used as a target ore. The quality of the concentrate was as follows: Cu: 30% by mass; Fe: 28% by mass; and S: 32% by mass.

Three grams of the above concentrate was mixed with 300 mL of a leaching solution (containing ammonium sulfate (3 g/L), potassium hydrogen phosphate (0.5 g/L), magnesium sulfate heptahydrate (0.5 g/L), and potassium chloride (0.1 g/L)) that had been adjusted to a pH of 1.8 with sulfuric acid and poured into a 500 mL Sakaguchi flask.

Leaching solutions A to D were each prepared in a manner such that silver nitrate, bacteria (iron-oxidizing bacteria and sulfur-oxidizing bacteria), and corn steep liquor (San-ei Sucrochemical Co., Ltd.) were added (or not added) to a leaching solution in the above flask at the corresponding concentrations described below. Each leaching solution was slowly shaken at 30° C. for leaching copper from a copper concentrate. Herein, the *Acidithiobacillus ferrooxidans* FTH6B strain (NITE BP-780) isolated in the Toyoha mine (Sapporo, Japan) was used as iron-oxidizing bacteria and the *Acidithiobacillus* sp. TTH19A (NITE BP-164) strain was used as sulfur-oxidizing bacteria. Each strain was added in a manner such that the bacterium concentration became $10^7$ cells/mL.

(Leaching Solution A)
 Silver nitrate: 10 mg/L (in terms of the silver concentration)
 Bacteria: Added
 Corn steep liquor: 0 g/L
(Leaching Solution B)
 Silver nitrate: 10 mg/L (in terms of the silver concentration)
 Bacteria: Added
 Corn steep liquor: 0.05 g/L
(Leaching Solution C)
 Silver nitrate: 10 mg/L (in terms of the silver concentration)
 Bacteria: Added
 Corn steep liquor: 0.1 g/L
(Leaching Solution D)
 Silver nitrate: 10 mg/L (in terms of the silver concentration)
 Bacteria: Added
 Corn steep liquor: 0.5 g/L Copper concentrations in the supernatants of leaching solutions A to D were determined with an ICP atomic emission spectrometer (ICP-AES). FIG. 1 shows the time course changes in the percentages of leached copper calculated by copper concentrations in the supernatants.

Based on the above results, it was confirmed that the addition of corn steep liquor at 0.05 to 0.1 g/L resulted in the promotion of copper leaching compared with a case in which no corn steep liquor was added. This is probably because the addition of corn steep liquor resulted in promotion of the growth of iron-oxidizing bacteria such that the rate of generation of iron (III) ions serving as oxidants was improved. However, as is understood based on the results for leaching solution D, the excessive addition of corn steep liquor (0.5 g/L) inhibited copper leaching.

Example 2

Influence of Silver Concentration

Leaching solutions E to H were each prepared in a manner such that silver nitrate, bacteria (iron-oxidizing bacteria and sulfur-oxidizing bacteria), and corn steep liquor were added (or not added) to a leaching solution in the above flask described in Example 1 at the corresponding concentrations described below. Each leaching solution was slowly shaken at 30° C. for leaching copper from a copper concentrate. The strains used in Example 1 were used as iron-oxidizing bacteria and sulfur-oxidizing bacteria. In addition, the amounts of bacteria added were the same as those described in Example 1.

Figure 2:
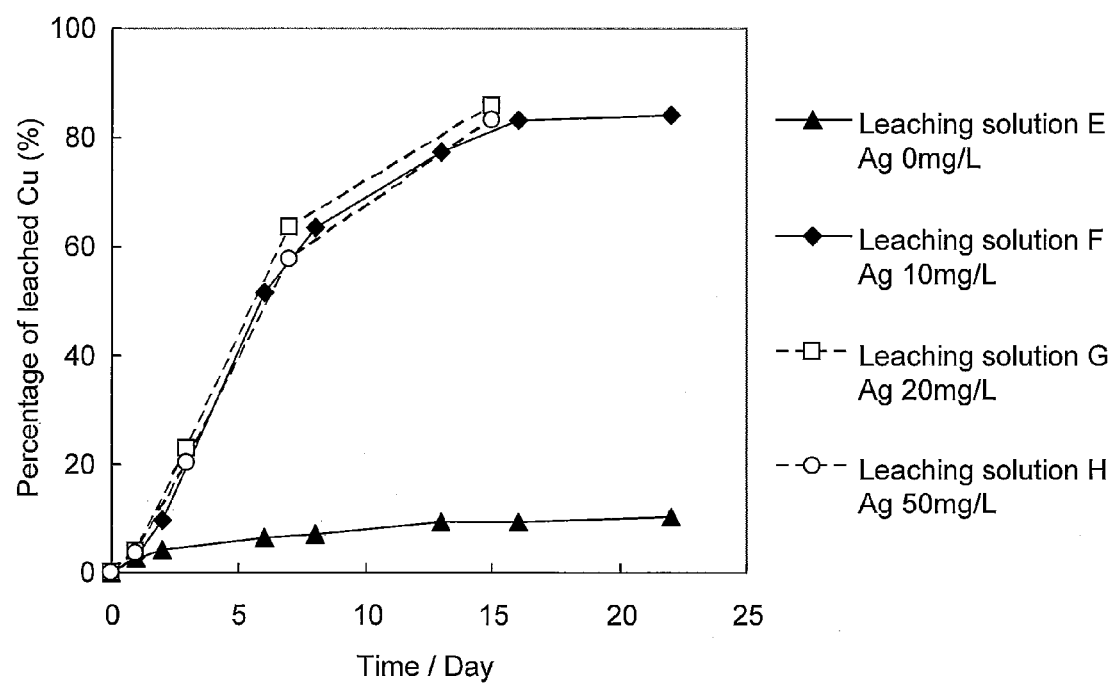
FIG. 2 shows influence of silver concentrations upon copper leaching.

(Leaching Solution E)
 Silver nitrate: 0 mg/L
 Bacteria: Added
 Corn steep liquor: 0.1 g/L
(Leaching Solution F)
 Silver nitrate: 10 mg/L (in terms of the silver concentration)
 Bacteria: Added
 Corn steep liquor: 0.1 g/L
(Leaching Solution G)
 Silver nitrate: 20 mg/L (in terms of the silver concentration)
 Bacteria: Added
 Corn steep liquor: 0.1 g/L
(Leaching Solution H)
 Silver nitrate: 50 mg/L (in terms of the silver concentration)
 Bacteria: Added
 Corn steep liquor: 0.1 g/L Copper concentrations in the supernatants of leaching solutions E to H were determined with an ICP atomic emission spectrometer (ICP-AES). FIG. 2 shows the time course changes in the percentages of leached copper calculated by copper concentrations in the supernatants.

Based on the results for leaching solutions F to H, it was confirmed that there are no significant differences in terms of the copper leaching rate when the amount of silver added is 10 mg/L or more. In view of this, it is considered that when the corn steep liquor concentration is 0.1 g/L, silver does not inhibit the iron-oxidizing capacity of iron-oxidizing bacteria at a silver concentration of 50 mg/L or lower. Further, based on the results for leaching solution E, it was also confirmed that substantially no copper is leached when a leaching solution does not contain silver.

Example 3

Influence of the Addition or No Addition of Bacteria

Figure 3:
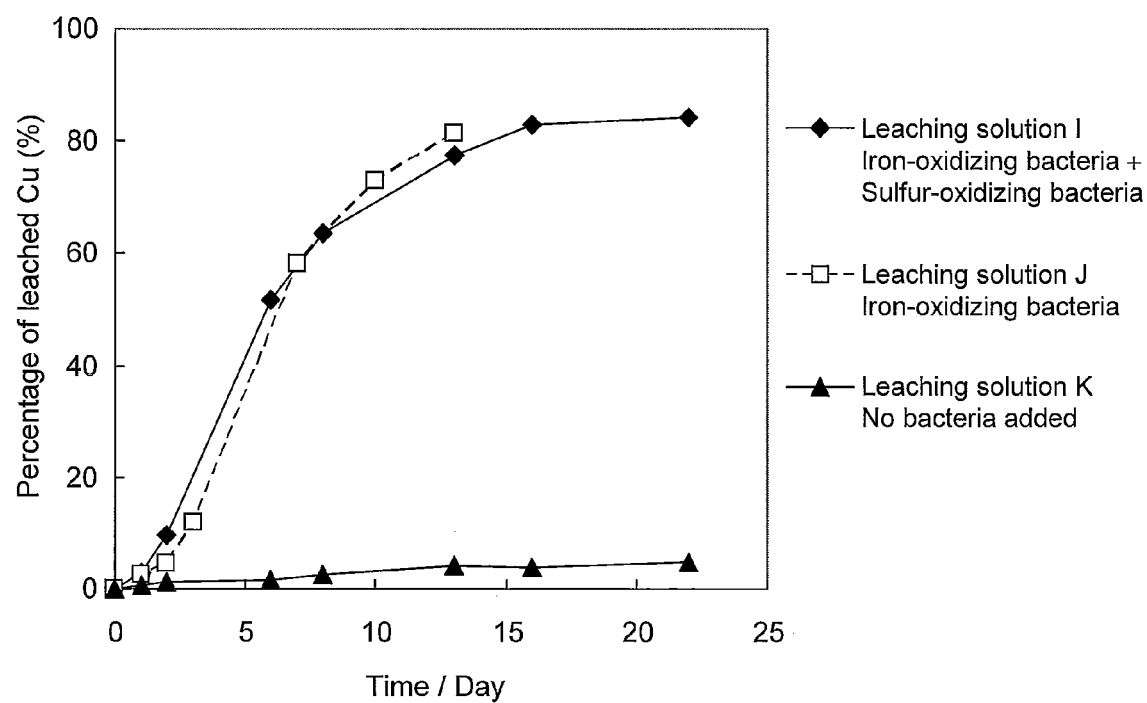
FIG. 3 shows influence of the addition or no addition of bacteria upon copper leaching.

Leaching solutions I to K were each prepared in a manner such that silver nitrate, bacteria (iron-oxidizing bacteria and sulfur-oxidizing bacteria), and corn steep liquor were added (or not added) to a leaching solution in the above flask described in Example 1 at the corresponding concentrations described below. Each leaching solution was slowly shaken at 30° C. for leaching copper from a copper concentrate. The strains used in Example 1 were used as iron-oxidizing bacteria and sulfur-oxidizing bacteria. In addition, the amounts of bacteria added were the same as those in described in Example 1.
(Leaching Solution I)
Silver nitrate: 10 mg/L (in terms of the silver concentration)
Bacteria: Iron-oxidizing bacteria and sulfur-oxidizing bacteria added
Corn steep liquor: 0.1 g/L
(Leaching Solution J)
Silver nitrate: 10 mg/L (in terms of the silver concentration)
Bacteria: Iron-oxidizing bacteria alone added
Corn steep liquor: 0.1 g/L
(Leaching Solution K)
Silver nitrate: 10 mg/L (in terms of the silver concentration)
Bacteria: Not added
Corn steep liquor: 0.1 g/L Copper concentrations in the supernatants of leaching solutions I to K were determined with an ICP atomic emission spectrometer (ICP-AES). FIG. 3 shows the time course changes in the percentages of leached copper calculated by copper concentrations in the supernatants.

As a result of comparison of the results for leaching solutions I and J with the results for leaching solution K, it was confirmed that substantially no copper leaching takes place without the addition of iron-oxidizing bacteria. This is because when no iron-oxidizing bacteria exist in a system, substantially no iron (III) ions are generated. In the leaching solutions I and J to which bacteria had been added, the bacterium concentration reached a maximum level of $10^9$ cells/mL. In addition, as a result of comparison of the results for leaching solution I with the results for leaching solution J, it was confirmed that the addition or no addition of sulfur-oxidizing bacteria does not significantly influence copper leaching.

Example 4

Influence of Types of Bacteria Added

Figure 4:
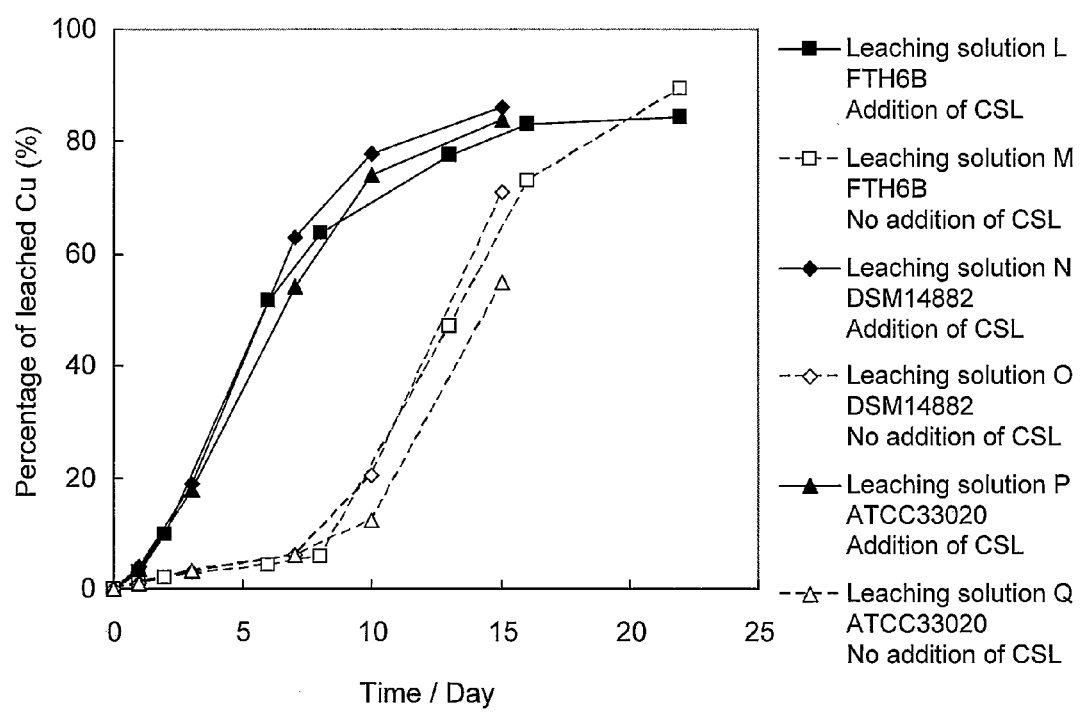
FIG. 4 shows influence of types of added bacteria upon copper leaching.

Leaching solutions L to Q were each prepared in a manner such that silver nitrate, bacteria (iron-oxidizing bacteria and sulfur-oxidizing bacteria), and corn steep liquor were added (or not added) to a leaching solution in the above flask described in Example 1 at the corresponding concentrations described below. Each leaching solution was slowly shaken at 30° C. for leaching copper from a copper concentrate. Any one of three different strains (the *Acidithiobacillus ferrooxidans* FTH6B strain (NITE BP-780), the *Acidithiobacillus ferrooxidans* DSM14882 strain, and the *Acidithiobacillus ferrooxidans* ATCC33020 strain) was used as iron-oxidizing bacteria. The *Acidithiobacillus* sp. TTH19A (NITE BP-164) strain was used as sulfur-oxidizing bacteria. The bacteria were added in a manner such that the bacterium concentration became $10^7$ cells/mL.
(Leaching Solution L)
Silver nitrate: 10 mg/L (in terms of the silver concentration)
Bacteria: FTH6B and TTH19A added
Corn steep liquor: 0.1 g/L
(Leaching Solution M)
Silver nitrate: 10 mg/L (in terms of the silver concentration)
Bacteria: FTH6B and TTH19A added
Corn steep liquor: 0 g/L
(Leaching Solution N)
Silver nitrate: 10 mg/L (in terms of the silver concentration)
Bacteria: DSM14882 and TTH19A added
Corn steep liquor: 0.1 g/L
(Leaching Solution O)
Silver nitrate: 10 mg/L (in terms of the silver concentration)
Bacteria: DSM14882 and TTH19A added
Corn steep liquor: 0 g/L
(Leaching Solution P)
Silver nitrate: 10 mg/L (in terms of the silver concentration)
Bacteria: ATCC33020 and TTH19A added
Corn steep liquor: 0.1 g/L
(Leaching Solution Q)
Silver nitrate: 10 mg/L (in terms of the silver concentration)
Bacteria: ATCC33020 and TTH19A added
Corn steep liquor: 0 g/L Copper concentrations in the supernatants of leaching solutions L to Q were determined with an ICP atomic emission spectrometer (ICP-AES). FIG. 4 shows the time course changes in the percentages of leached copper calculated by copper concentrations in the supernatants.

Based on the results for leaching solutions L to Q, it was confirmed that copper leaching is promoted by the addition of silver and corn steep liquor, regardless of the type of the strain of iron-oxidizing bacteria added.

[Accession No.]
NITE BP-780

INDUSTRIAL APPLICABILITY

According to the method of the present invention, the following effects can be obtained.
(1) Copper leaching from a copper sulfide ore containing chalcopyrite can be efficiently carried out even at ordinary temperatures (20° C. to 40° C.).
(2) When a sulfuric acid solution to which iron-oxidizing bacteria and silver have been added is used as a leaching solution, a naturally occurring nitrogen-containing organic component such as corn steep liquor is added to the leaching solution such that the growth of iron-oxidizing bacterium is promoted, resulting in the improvement of the rate of production of iron (III) ions serving as oxidants. As a result, the copper leaching rate can be improved due to synergistic effects provided by iron (III) ions and silver serving as a leaching catalyst.

What is claimed is:

1. A method of leaching copper from a copper sulfide ore, comprising
adding a corn steep liquor to a leaching solution upon copper leaching from a copper sulfide ore,
wherein the concentration of the corn steep liquor in the leaching solution is 0.05 to 0.1 g/L and the leaching solution comprises a sulfuric acid solution to which iron-oxidizing bacteria and silver have been added.

2. The method according to claim 1, wherein the copper sulfide ore is a copper sulfide ore or concentrate containing chalcopyrite as a main constituent.

3. The method according to claim 1, wherein the silver concentration in the leaching solution is 10 to 50 mg/L.

4. The method according to claim 2, wherein the silver concentration in the leaching solution is 10 to 50 mg/L.

* * * * *